UNITED STATES PATENT OFFICE.

ARTHUR W. TOMASHOT, OF CLEVELAND, OHIO, ASSIGNOR TO THE GENERAL LABORATORIES COMPANY, OF CLEVELAND, OHIO, A CORPORATION OF OHIO.

CLEANING PREPARATION.

1,316,090.          Specification of Letters Patent.      Patented Sept. 16, 1919.

No Drawing.      Application filed July 29, 1918. Serial No. 247,165.

*To all whom it may concern:*

Be it known that I, ARTHUR W. TOMASHOT, a citizen of the United States, residing at Cleveland, in the county of Cuyahoga and State of Ohio, have invented certain new and useful Improvements in Cleaning Preparations, of which the following is a specification.

This invention relates to cleaning preparations or compounds and aims to provide an improved preparation adapted for cleaning walls, woodwork, painted, enameled and varnished surfaces, marble, tile, linoleum, oilcloth, linen shades, etc. It is used in the form of a paste and applied to the article to be cleaned with a brush, rag or sponge. The article is then rinsed with clear water to remove the dirt, grime or spots from the surface.

The preparation comprises any alkalis or earth metals which act as a detergent, having an action loosening the dirt, and an abrasive having more or less scouring action. To those are added a flour acting as a base to hold the alkali in suspension and giving an even surface to the mixture. The flour when mixed into a paste holds all ingredients in suspension. If desired a coloring matter may be added and the entire mixture is in a powdered form readily placed in packages and transportable without danger. In use the preparation is mixed with water whereby a paste is formed.

Sodium carbonate is desirably used as the alkali and the improved powdered mixture comprises about 25% of this material. Other alkalis, such as sal soda may be used, and the proportion may be somewhat diminished but should not be much increased as there would then be danger of loosening the paint on the surface on which the preparation is employed.

The abrasive may be pumice stone, marble dust or fullers' earth and the powdered mixture comprises about 25% of this element. The proportion may be somewhat increased but any substantial increase from the proportion given is likely to cause damage to a surface by too great scouring action.

It has been found that hominy flour has the desirable quality in preparation of this type of making a paste without cooking, and the same is true of cornstarch. If a paste is to be cooked other flours may be used, but the hominy flour or cornstarch has the great advantage of convenience of use. The powdered mixture can be made into a paste by mere addition of cold water and thus the paste can be made at any place and without needing any heating medium. A smooth paste is produced with hominy flour, and this substance will take up more water than other flours in making such a paste.

By the addition of the water to form a paste the alkali, such as sodium carbonate is dissolved, while the abrasive, such as pumice stone, quartz or silica are held in suspension by the hominy flour or cornstarch. The other elements prevent the alkali from eating the surface.

With the mixture described it is not necessary to scrub the surface to be cleaned. The paste is merely spread smoothly over the surface, as for example, by a brush, rag or sponge. Then the remaining part of the paste may be rinsed off with clear water.

The action of the mixture is that the alkali acts on the material to be removed and dissolves it. The abrasive has more or less scouring action, thus tending to carry off the material which has been so loosened. The flour holds the alkali in suspension and gives an even surface to the mixture.

The powdered mixture thus may consist of hominy flour 50%, pumice stone 25% and sodium carbonate 25%, with coloring added if desired. To one pound of the mixture one gallon of water may be added to make a paste. If it is desired to make up the preparation all at once, it may be done by taking water one gallon, or, say, seven and one-half pounds, and adding hominy flour one-half pound, pumice stone one-quarter pound and sodium carbonate one-quarter pound, thus making eight and one-half pounds of a perfectly smooth paste without cooking. As before stated, cornstarch may be used instead of hominy flour and other abrasives and alkalis, such as those previously mentioned may be employed.

While the preparation may be made up in paste form in the first place by mixing the ingredients with water, in most cases the preparation will be supplied in powdered form because such a powder is much easier to ship, and, of course, is much lighter than if the water had already been added. The ability to make a paste with cold water and without cooking furnishes an additional reason why the preparation may be supplied in powdered form, as by the addition of the proper portion of the water any desired amount of paste can be made for use at a time and no wet paste will be compelled to be taken care of until it is all used.

Having thus fully described my invention, what I claim as new and desire to secure by Letters Patent, is:—

1. A cleaning compound comprising hominy flour, 50%, pumice stone 25% and sodium carbonate 25%.

2. A cleaning paste comprising water, one gallon, hominy flour one-half pound, an abrasive one-quarter pound and an alkali one-quarter pound.

3. A cleaning paste comprising water one gallon, hominy flour one-half pound, pumice stone one-quarter pound, and sodium carbonate one-quarter pound.

4. A cleansing compound comprising hominy flour substantially 50 per cent. and pumice stone and sodium carbonate.

5. A cleansing paste comprising substantially water one gallon, hominy flour one-half pound, an abrasive and an alkali.

6. A cleansing paste comprising water one gallon, hominy flour one-half pound, pumice stone, and sodium carbonate.

In testimony whereof, I affix my signature.

ARTHUR W. TOMASHOT.